United States Patent [19]

Dauvergne

[11] Patent Number: 5,377,528
[45] Date of Patent: Jan. 3, 1995

[54] MEASURING DEVICE FOR MEASURING PARAMETERS IN AN AIR STREAM TO BE INTRODUCED INTO THE CABIN OF A MOTOR VEHICLE

[75] Inventor: Jean Dauvergne, Fosses, France

[73] Assignee: Valeo Thermique Habitacle, Le Mesnil-Saint-Denis, France

[21] Appl. No.: 99,159

[22] Filed: Jul. 29, 1993

[30] Foreign Application Priority Data

Jul. 30, 1992 [FR] France ................. 92 09471

[51] Int. Cl.$^6$ ............... B60H 1/32; F25B 49/00
[52] U.S. Cl. ................... 73/31.01; 73/23.2;
454/75; 454/139; 454/256; 165/41; 165/11.1
[58] Field of Search ............. 73/23.2, 31.01;
165/11.1, 41, 44; 454/75, 139, 256

[56] References Cited

U.S. PATENT DOCUMENTS

| | | | |
|---|---|---|---|
| 2,013,601 | 9/1935 | Clark | 454/139 |
| 2,640,409 | 6/1953 | Hans | 165/44 |
| 4,373,662 | 2/1983 | Bassett et al. | 165/11.1 |
| 4,449,574 | 5/1984 | Yoshino et al. | 165/11.1 |
| 4,567,939 | 2/1986 | Dumbeck | 165/16 |
| 4,606,219 | 8/1986 | Bout et al. | 73/23 |
| 4,763,564 | 8/1988 | Czarnecki et al. | 98/2.11 |
| 4,875,406 | 10/1989 | Hölter et al. | 454/75 |
| 4,932,588 | 6/1990 | Fedter et al. | 236/44 R |
| 5,042,997 | 8/1991 | Rhodes | 55/126 |
| 5,228,306 | 7/1993 | Shyu et al. | 62/176.6 |
| 5,253,804 | 10/1993 | Sarazen, Jr. et al. | 454/256 |
| 5,256,103 | 10/1993 | Abthoff et al. | 454/139 |
| 5,259,813 | 11/1993 | Abthoff et al. | 454/75 |
| 5,259,814 | 11/1993 | Weissbrich et al. | 454/75 |

FOREIGN PATENT DOCUMENTS

| | | |
|---|---|---|
| 2548782 | 5/1984 | France . |
| WO8800537 | 1/1988 | Germany . |
| 57-134315 | 8/1982 | Japan . |

OTHER PUBLICATIONS

French Search Report [2 pages].

Primary Examiner—Hezron E. Williams
Assistant Examiner—J. David Wiggins
Attorney, Agent, or Firm—Morgan & Finnegan

[57] ABSTRACT

Air to be introduced into the cabin of a motor vehicle passes over a measuring device, in which parameters such as temperature, humidity and pollution are measured. The measuring device comprises a housing having an air inlet, which is supplied with a fraction of the air stream, and an air outlet for evacuating this fraction. The housing has an internal chamber which communicates with both the air inlet and the air outlet, and air circulating means such as a pump are provided for setting up a differential pressure between the inlet and outlet so that the fraction of the air stream to be measured flows through the chamber in the housing. The sensor or sensors are arranged in this chamber, so that they are always ventilated by the air passing through the latter.

9 Claims, 2 Drawing Sheets

MEASURING DEVICE FOR MEASURING PARAMETERS IN AN AIR STREAM TO BE INTRODUCED INTO THE CABIN OF A MOTOR VEHICLE

FIELD OF THE INVENTION

This invention relates to a measuring device for measuring parameters in an air stream which is to be subsequently introduced into a cabin of a motor vehicle.

BACKGROUND OF THE INVENTION

Measuring devices of this kind are already known which include one or more sensors which are arranged to measure various physical and/or chemical parameters in an air stream. The most widely used type of measuring device comprises a temperature sensor or temperature sonde, in the form of a thermistor. This sensor is located in a selected location in the vehicle, in the path of the air stream before the latter is introduced into the cabin of the vehicle.

A conventional motor vehicle typically has a heating and ventilating (and/or air conditioning) installation which includes, in particular, an air inlet casing which has a fresh air inlet, for introduction of fresh air from outside the vehicle, controlled by a flap valve, together with another air inlet for admitting air recirculated from the cabin of the vehicle and controlled by another flap valve. When such a vehicle is provided with a temperature sensor as mentioned above, the latter is often placed in the air inlet casing of the installation, upstream of the flap valve that controls the admission of fresh air from outside the vehicle (i.e. upstream with reference to the direction of flow of the air stream).

Such an arrangement does have certain disadvantages. In this connection, if the sensor is operating correctly when the installation is in its fresh air mode, then since the sensor is under those conditions ventilated by the stream of fresh air, the same is not true in the alternative situation where the installation is operating in its recirculated air mode. In this latter case, the sensor is not in fact ventilated, and the information derived from the sensor is corrupted by the thermal radiation of the vehicle itself, and in particular that coming from the engine, since the engine is generally quite close to the heating, ventilating or air conditioning installation itself.

In order to overcome this drawback, it has been proposed that the latest measured value of the parameter concerned, represented by the signal from the sensor, should be memorised before the installation is changed from its fresh air mode to its recirculated air mode. It has also been proposed to mount the temperature sensor on the flap valve which controls the admission of fresh air, so as to make its position variable and to improve its ventilation.

However, these solutions do involve certain complications in the construction of the installation; yet, at the same time, they still fail to ensure that the temperature sensor will always give signals that represent the true values of the parameter to be measured.

Apart from temperature sensors, the sensors may of course include at least one other sensor for measuring at least one other parameter. These may for example comprise suitable sensors for measurement of humidity (absolute or relative) in the air stream, with a view to controlling the humidity within the cabin at a required level. Since these humidity sensors are generally located in the same position as the temperature sensors, they are subject to the same drawbacks as have been mentioned above.

In addition, chemical, or physico-chemical, sensors may be provided for dealing with pollution problems. These sensors are of a type which are capable of detecting the presence of noxious gases, especially carbon monoxide, oxides of nitrogen, and hydrocarbon exhaust gases. However, pollution sensors at present pose a double problem. First of all, since these sensors are capable of giving a command for passing air in a recirculating mode, they must also be capable of giving the opposite command when the pollution has been dispersed. However, this is not possible if the sensors are not correctly ventilated or aerated by the air stream. In addition, the pollution sensors are in general heated to temperatures which may attain a local mean value of the order of 100 to 400 degrees C., in order to activate the chemical reactions which are the basis of the operation of such sensors. Here again, if the sensors are not correctly ventilated, they may give erroneous values, as may the adjacent sensors. Another undesirable result that may occur is deterioration of the sensors under the effect of high temperatures.

DISCUSSION OF THE INVENTION

A principal object of the invention is to overcome the drawbacks mentioned above.

One particular object of the invention is to provide a measuring device of the kind mentioned above which will always give true values representing the real values of the parameters to be measured in the air stream.

Another object of the invention is to provide such a device which can be fitted in an appropriate location in the motor vehicle without being sensitive to the external environment, and in particular to thermal radiation in the vehicle.

A further object of the invention is to provide such a measuring device which is adapted to include different types of sensors, comprising mainly (though not exclusively) temperature sensors.

To this end, according to the invention, a measuring device, of the type defined under "Field of the Invention" above, comprises:

a housing having an air inlet which is adapted to be supplied with a fraction (to be measured) of the air stream admitted to the installation, an air outlet adapted to evacuate the said fraction of the air stream, and an internal chamber which communicates with the said air inlet and air outlet;

circulating means for setting up a differential pressure between the said air inlet and air outlet, and to cause the said fraction of the air stream to flow through the internal chamber; and at least one measuring sensor located in the internal chamber of the housing and arranged for the said fraction of the air stream to flow over it, and to give an output signal representing a value of a parameter to be measured, the measuring device further including an electronic circuit to which at least one said sensor is connected, the said electronic circuit being mounted in the internal chamber of the housing.

With this arrangement, the measuring device enables the sensor or sensors to be in the air stream at all times. In addition, it enables the electronic circuit to be ventilated in the same way. This ventilation of the sensor or sensors and the electronic circuit is by way of either an air flow drawn from the air stream introduced into the cabin of the vehicle, or an air flow drawn from outside the vehicle and subsequently evacuated to the environment outside the vehicle.

As a result, the sensors and the electronic circuit are permanently ventilated by a flow of air, the physical and/or physico-chemical parameters of which are substantially identical to those of the air stream introduced into the cabin, or, at least, substantially identical to those of the air outside the vehicle. In addition, the sensors and the electronic circuit are sheltered from outside disturbing influences, and particularly from thermal radiation arising from the vehicle itself. Under these conditions, the measuring device may be fitted in any desired location within the vehicle, and in particular in the air inlet casing of the heating and ventilating (and/or air conditioning) installation, while being capable of giving output signals which represent actual values of the parameters to be measured.

The measuring device preferably includes an electrical connector which is adapted to make an electrical connection between the printed circuit and a connecting cable outside the housing of the device, this electrical connector passing through a wall of the housing. In the case in which there is an air pump in the housing, this electrical connector also provides the connection for this air pump.

The measuring device according to the invention preferably has at least one sensor for measuring a parameter selected from a value of temperature, a measure of humidity, and a measure of pollution in the air stream being measured.

The measuring device may include a temperature sensor, a humidity sensor and at least one pollution sensor, arranged in the housing of the measuring device in such a way that the fraction of the air stream flowing within the housing of the measuring device meets the sensors in that order.

The air circulating means of a measuring device according to the invention may comprise either a vacuum source, derived for example from the engine of the vehicle, or a dynamic vacuum source; it may alternatively comprise a pressure source such as an air pump. The pressure source, particularly where it comprises an air pump, is preferably arranged within the housing of the measuring device, which enables the latter to be made of very compact construction.

The air inlet of the housing preferably comprises a grille, with its air outlet comprising an outlet tube branch which is connected to a suitable evacuation duct.

A preferred embodiment of the invention will be described below, by way of example only and with reference to the accompanying drawings.

DESCRIPTION OF A PREFERRED EMBODIMENT OF THE INVENTION

Figure 1:
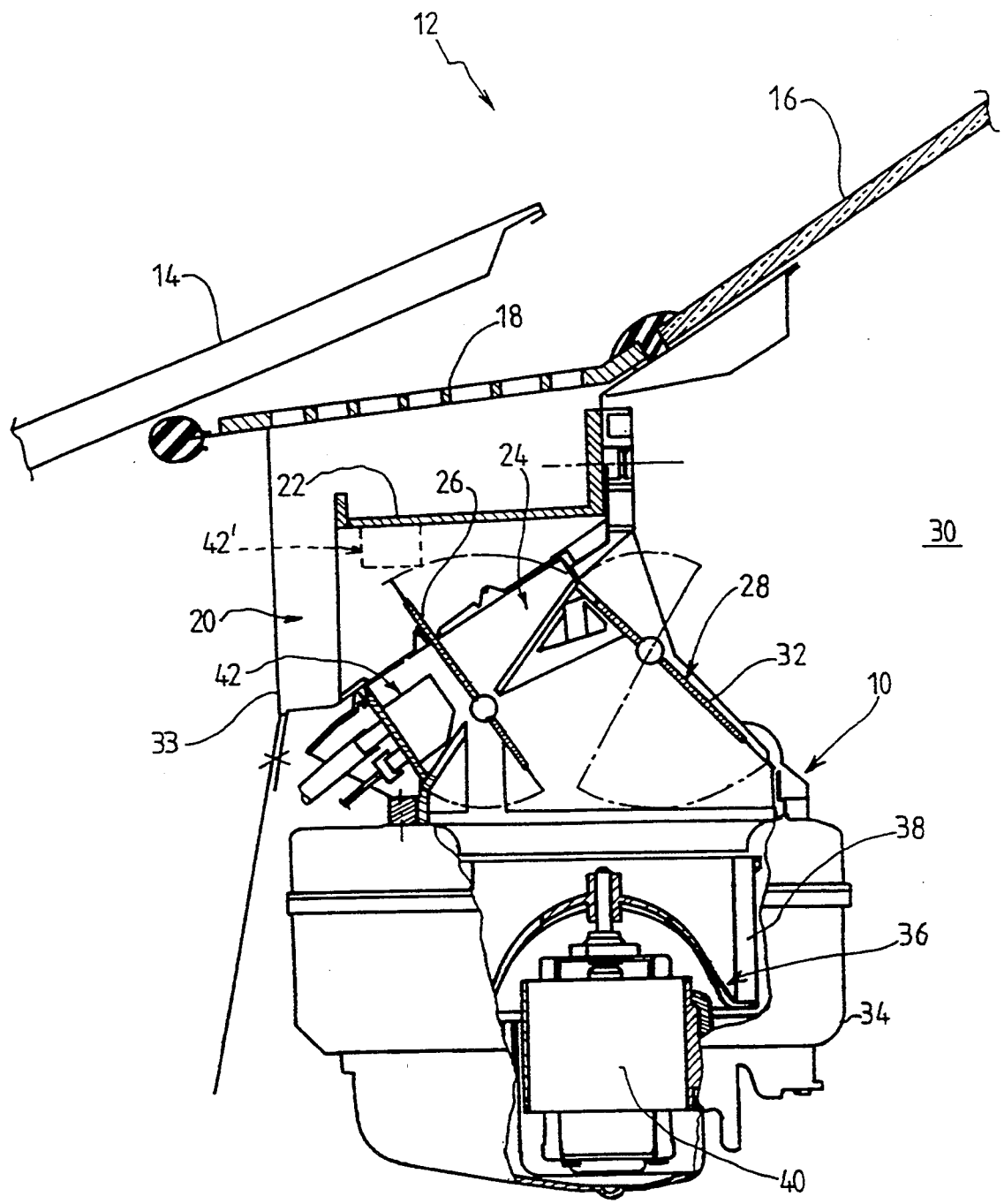
FIG. 1 is a view in cross section showing part of an air inlet casing which is part of a heating and ventilating, and/or air conditioning, installation in a motor vehicle (only a small part of which is shown), this casing including a measuring device in accordance with the invention.

Reference is first made to FIG. 1, which shows a fresh air inlet casing 10 which is part of a heating and ventilating, and/or air conditioning, installation in a motor vehicle generally indicated at 12. Of the latter, only part of the engine hood 14 and windshield 16 are shown in FIG. 1, together with a fresh air inlet grille 18 which is situated at the base of the windshield 16 and partly below the hood 14. The grille 18 is provided for the purpose of introducing fresh air from outside the vehicle into an air inlet chamber 20 in which a gutter 22 is situated. The air inlet chamber 20 communicates with a first air inlet 24 of the casing 10, and a pivoting flap valve 26 is mounted in the air inlet 24 for the purpose of regulating the flow of air through the latter. Thus the flap valve 26 enables fresh air from outside the motor vehicle to be admitted in a controlled manner into the casing 10.

The air inlet casing 10 has, in addition, a second air inlet 28 which communicates with the cabin 30 of the motor vehicle, and which is controlled by a second pivoting flap valve 32. This second valve 32 controls the flow of air admitted by way of re-circulation to the air inlet casing 10 from the cabin 30. The cabin 30 is separated from the engine compartment of the vehicle by a fire resistant bulkhead 33, and the heating and ventilating (and/or air conditioning) installation lies close to this bulkhead 33, on the same side of the latter as the cabin 30.

The air inlet casing 10 of the installation is in communication with a volute chamber 34, in which a fan 36 is mounted. The fan 36 comprises a fan rotor 38 which is driven in rotation by an electric motor 40. The air which is admitted into the casing 10 via the air inlet 24 or 28 is accelerated by the fan 38 and is then driven through the remainder of the installation, in which it may be heated or cooled in a known manner, by conventional means not shown.

The air inlet casing 10, to the extent to which it has been described up to this point, is constructed in a known manner. Beyond this, however, it is provided with a measuring device 42 which in this example is located in the casing 10, in immediate proximity to the fresh air inlet 24 and the zone in which the fresh air control flap valve 26 operates. However, in a modified version, the measuring device 42 may be located in the air inlet chamber 20, underneath the gutter 22 as indicated at 42'. In this latter case, it will be realized that the device 42 is associated with the casing 10 but outside it.

Figure 3:
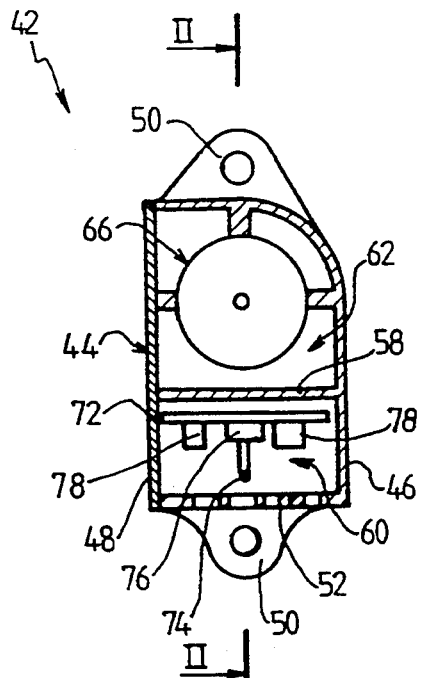
FIG. 3 is a view in cross section taken on the line III—III in FIG. 2.
Figure 2:
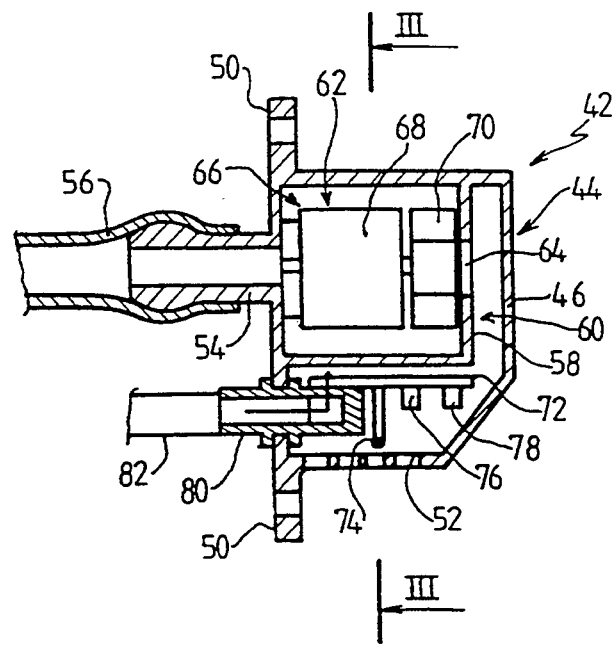
FIG. 2 is a view in cross section showing the measuring device itself, which is carried by the air inlet casing of the FIG. 1, the cross section in FIG. 2 being taken on the line II—II in FIG. 3.
Figure 4:
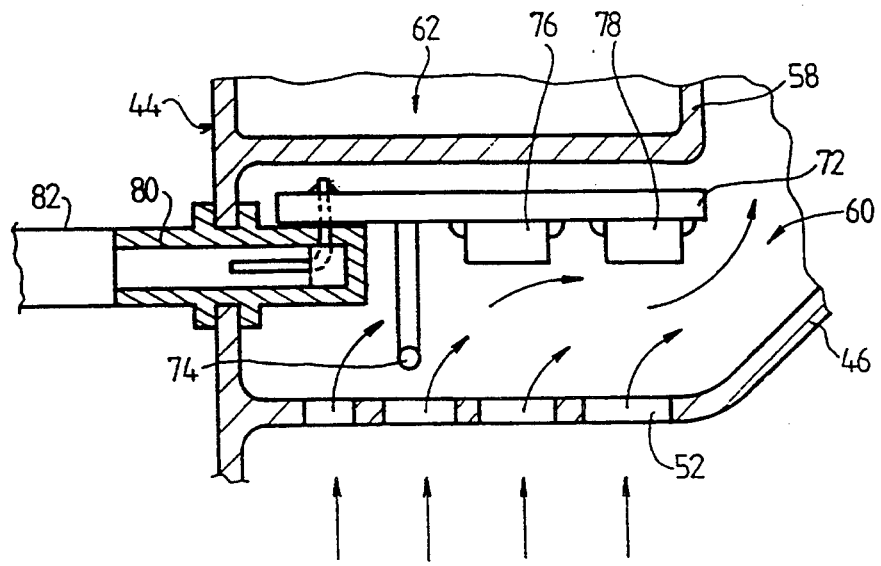
FIG. 4 is a detail of FIG. 2 but on a larger scale.

The measuring device 42 will now be described in more detail with reference to FIGS. 2 to 4. It has a housing 44 which comprises a housing body 46 and a cover plate 48. The housing body 46 has two fastening lugs 50 for securing the housing in the selected location on the vehicle, as for example shown in FIG. 1 at 42 or 42'. The body 46 also has an air inlet grille 52 through which a fraction of the air stream to be measured is admitted into the interior of the housing 44. In this example, this is of course a fraction of the air stream which is admitted into the main casing 10 of the heating and ventilating (and/or air conditioning) installation. The housing body 46 also has an outlet branch 54 (see FIG. 2) which is connected to an evacuation tube 56.

The housing 44 is divided internally by an internal bulkhead 58 which defines within the housing an inlet chamber or measuring chamber 60, which communicates with the grille 52, together with an outlet chamber 62 which communicates with the outlet branch 54. The chambers 60 and 62 are in communication with each other through an aperture 64 which is formed through the bulkhead 58. An air pump 66 is mounted within the outlet chamber 62, and comprises a motor 68 driving a rotor 70.

An electronic circuit 72 is located in the inlet or measuring chamber 60, while a temperature sensor 74, a humidity sensor 76, and two pollution sensors 78, are connected electrically with the electronic circuit 72. The measuring device 42 also includes an electrical connector 80 (seen in FIGS. 2 and 4), which passes through one wall of the housing body 46 so as to make an electrical connection between an electric cable 82 outside the housing 44 and, within the housing, the electronic circuit 72 and the motor 68 of the air pump 66.

The measuring device 42 operates in the following way. The pump rotor 70, driven by the motor 68, sets up a pressure gradient between the inlet and outlet of the housing 44, and thus draws into the latter a fraction of the air in the air stream to be measured. In this example, this fraction of air is taken from the air inlet casing 10 or below the gutter 22 as indicated in FIG. 1. The air which is thus drawn into the housing 44 flows around the sensors 74, 76 and 78 supported by the electronic circuit 72, and then penetrates into the outlet chamber 62 through the aperture 64, after which it passes through the pump rotor 70, to be finally evacuated to outside through the evacuation tube 56. As can be seen from FIG. 4, the air passes first of all over the temperature sensor 74, and then over the other sensors 76 and 78 in that order.

The electronic circuit 72 may also include processing elements (not shown), for example integrated circuits, the purpose of which is to amplify the signals from the various sensors, and to correct these sensor signals, and particularly to correct the signals given by the humidity sensor 76 and the pollution sensors 78 according to the temperature measured by the temperature sensor 74.

In the example shown in the drawings, the flow of a fraction of the air stream into the housing 44 of the measuring device 42 is obtained by means of an air pump. However, in a modified version the air pump 66 may be replaced by an external vacuum source, derived for example from the engine of the vehicle. As already indicated, the measuring device 42 may equally well be placed below the gutter 22 as indicated at 42'. This is of course only one example of a possible location for the measuring device, and it is possible to locate it elsewhere in the installation.

The physical and/or chemical parameters of the air stream which is to be introduced into the cabin of a motor vehicle can be measured accurately by means of the apparatus in accordance with this invention, for example as described above and shown in the drawings.

What is claimed is:

1. A measuring device for measuring parameters in an air stream to be introduced into a cabin of a motor vehicle through a single unit in order to regulate the apparatus for controlling the climate within the motor vehicle, wherein the measuring device comprises: a housing defining the single unit that is completely separate and distinct from the climate control apparatus, said housing having an air inlet for admitting a fraction, to be measured, of said air stream, an air outlet within said housing for evacuation of said fraction, and an internal chamber communicating with said air inlet and said air outlet in said housing for the single unit; air circulating means within said housing for the single unit for setting up a differential pressure between said air inlet and air outlet so as to cause said fraction to flow through said internal chamber; and at least one measuring sensor within said internal chamber of the single unit within said housing for giving an output signal representing the instant value of a corresponding parameter of the air stream when said fraction of the air stream passes in contact with the sensor within the housing, and wherein the measuring device further includes a circuit within said housing for the single unit connected to at least one said sensor and located in said internal chamber for regulating the separate and distinct apparatus for controlling the motor vehicle climate outside of said single unit housing.

2. A measuring device according to claim 1 in which, the housing device defining a housing wall, the device further includes an electrical connector passing through the said housing wall and being connected to the said electronic circuit, for connecting the latter electrically to an external connecting cable.

3. A measuring device according to claim 1, wherein the said at least one sensor comprises at least one sensor for measuring at least one respective parameter selected from temperature, humidity and pollution.

4. A measuring device according to claim 3 in which said sensors comprise a temperature sensor, a humidity sensor and at least one pollution sensor, wherein said sensors are arranged in that order in said internal chamber, whereby said fraction of the air stream flowing within the housing of the device meets the sensors in that order.

5. A measuring device according to claim 1, wherein said air circulation means comprises a vacuum source.

6. A measuring device according to claim 1, wherein said air circulating means comprises a pressure source.

7. A measuring device according to claim 6, wherein the pressure source comprises an air pump.

8. A measuring device according to claim 5, wherein said air circulating means are located within the housing of the device.

9. A measuring device for measuring parameters in an air stream to be introduced into a cabin of a motor vehicle, wherein said measuring device comprises: a housing defining an air inlet for admitting a fraction, to be measured, of said air stream, an air outlet for evacuation of said fraction, and an internal chamber communicating with said air inlet and air outlet; air circulating means for setting up a differential pressure between said air inlet and air outlet so as to cause said fraction to flow through said internal chamber; and at least one measuring sensor within said internal chamber for giving an output signal representing the instant value of a corresponding parameter of the air stream when said fraction of the latter passes in contact with the sensor, and wherein the measuring device further includes an electronic circuit connected to at least one said sensor and located in the said internal chamber, wherein the housing of the device further includes a grille defining said air inlet, and an outlet tube branch defining said air outlet and arranged to be connected to an external evacuation duct.

* * * * *